(12) United States Patent
Gara et al.

(10) Patent No.: US 8,868,837 B2
(45) Date of Patent: *Oct. 21, 2014

(54) CACHE DIRECTORY LOOKUP READER SET ENCODING FOR PARTIAL CACHE LINE SPECULATION SUPPORT

(75) Inventors: Alan Gara, Mount Kisco, NY (US); Martin Ohmacht, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 300 days.

This patent is subject to a terminal disclaimer.

(21) Appl. No.: 13/008,602

(22) Filed: Jan. 18, 2011

(65) Prior Publication Data

US 2011/0219187 A1 Sep. 8, 2011

Related U.S. Application Data

(60) Provisional application No. 61/299,911, filed on Jan. 29, 2010, provisional application No. 61/295,669, filed on Jan. 15, 2010.

(51) Int. Cl.
G06F 12/00 (2006.01)
G06F 13/00 (2006.01)
G06F 13/28 (2006.01)
G06F 12/08 (2006.01)

(52) U.S. Cl.
CPC ...................................... G06F 12/08 (2013.01)
USPC ............ 711/130; 711/E12.026; 711/E12.027; 711/E12.032; 711/E12.038

(58) Field of Classification Search
CPC ............ G06F 12/0817; G06F 12/0815; G06F 9/3834; G06F 12/084
USPC ........................................................ 711/130
See application file for complete search history.

(56) References Cited

U.S. PATENT DOCUMENTS

| | | | |
|---|---|---|---|
| 5,170,477 A | * | 12/1992 | Potter et al. .................. 711/201 |
| 5,895,492 A | | 4/1999 | Greenspan et al. |
| 6,212,605 B1 | | 4/2001 | Arimilli et al. |
| 6,347,360 B1 | | 2/2002 | Moudgal et al. |
| 6,356,983 B1 | | 3/2002 | Parks |
| 6,460,130 B1 | | 10/2002 | Trull et al. |
| 6,564,302 B1 | | 5/2003 | Yagi et al. |
| 7,350,027 B2 | | 3/2008 | Gara et al. |
| 7,376,800 B1 | | 5/2008 | Choquette et al. |
| 7,404,041 B2 | | 7/2008 | Gara et al. |
| 7,500,087 B2 | | 3/2009 | Saha |

(Continued)

OTHER PUBLICATIONS

Ceze et al., "Bulk Disambiguation of Speculative Threads in Multiprocessors", ISCA, Jun. 2006.

(Continued)

*Primary Examiner* — Kenneth Lo
*Assistant Examiner* — Sidney Li
(74) *Attorney, Agent, or Firm* — Scully, Scott, Murphy & Presser, P.C.; Daniel P. Morris, Esq.

(57) ABSTRACT

In a multiprocessor system, with conflict checking implemented in a directory lookup of a shared cache memory, a reader set encoding permits dynamic recordation of read accesses. The reader set encoding includes an indication of a portion of a line read, for instance by indicating boundaries of read accesses. Different encodings may apply to different types of speculative execution.

18 Claims, 7 Drawing Sheets

(56) References Cited

U.S. PATENT DOCUMENTS

| | | |
|---|---|---|
| 7,523,266 B2 | 4/2009 | Chaudhry et al. |
| 7,657,880 B2 | 2/2010 | Wang et al. |
| 7,814,378 B2 | 10/2010 | Manovit et al. |
| 7,836,260 B2 | 11/2010 | Gara et al. |
| 8,060,857 B2 | 11/2011 | Biggerstaff |
| 8,180,977 B2 | 5/2012 | Rajwar et al. |
| 8,185,700 B2 | 5/2012 | Gimeno et al. |
| 8,205,067 B2 | 6/2012 | Kriegel et al. |
| 2002/0083297 A1 | 6/2002 | Modelski et al. |
| 2002/0133672 A1 | 9/2002 | van de Waerdt et al. |
| 2002/0133682 A1 | 9/2002 | van de Hansen et al. |
| 2002/0199070 A1 | 12/2002 | Chaudhry et al. |
| 2003/0014597 A1 | 1/2003 | van de Waerdt |
| 2004/0193845 A1 | 9/2004 | Thimmannagari et al. |
| 2005/0204119 A1 | 9/2005 | Saha |
| 2006/0041722 A1 | 2/2006 | Hakura et al. |
| 2006/0090044 A1 | 4/2006 | Killier, III et al. |
| 2006/0095680 A1 | 5/2006 | Park et al. |
| 2006/0143390 A1 | 6/2006 | Kottapalli |
| 2006/0161740 A1 | 7/2006 | Kottapalli et al. |
| 2006/0161919 A1 | 7/2006 | Onufryk et al. |
| 2007/0028021 A1 | 2/2007 | Gasloms |
| 2007/0067573 A1 | 3/2007 | Bruening et al. |
| 2007/0168619 A1* | 7/2007 | Hutton et al. .................. 711/141 |
| 2007/0192540 A1 | 8/2007 | Gara et al. |
| 2007/0294481 A1 | 12/2007 | Hoover et al. |
| 2008/0195820 A1 | 8/2008 | Lais et al. |
| 2008/0263280 A1* | 10/2008 | Gara et al. ..................... 711/121 |
| 2008/0288819 A1 | 11/2008 | Heller, Jr. |
| 2008/0307169 A1 | 12/2008 | Averill et al. |
| 2008/0313437 A1* | 12/2008 | Gschwind ..................... 712/219 |
| 2009/0024835 A1 | 1/2009 | Fertig et al. |
| 2009/0031310 A1 | 1/2009 | Lev et al. |
| 2009/0083488 A1* | 3/2009 | Madriles Gimeno et al. 711/118 |
| 2009/0150890 A1 | 6/2009 | Yourst |
| 2009/0177847 A1 | 7/2009 | Ceze et al. |
| 2009/0235262 A1 | 9/2009 | Ceze et al. |
| 2009/0268736 A1 | 10/2009 | Allison et al. |
| 2009/0276581 A1 | 11/2009 | Moga et al. |
| 2010/0122038 A1 | 5/2010 | Manovit et al. |
| 2010/0169577 A1 | 7/2010 | Kiyota |
| 2010/0205609 A1 | 8/2010 | Cypher |
| 2010/0235580 A1 | 9/2010 | Bouvier |
| 2010/0235598 A1 | 9/2010 | Bouvier |
| 2010/0332765 A1 | 12/2010 | Cypher |
| 2011/0016470 A1 | 1/2011 | Cain, III et al. |
| 2011/0055484 A1 | 3/2011 | Eichenberger et al. |
| 2011/0066811 A1 | 3/2011 | Sander et al. |
| 2011/0119446 A1 | 5/2011 | Blumrich et al. |
| 2011/0138126 A1 | 6/2011 | Blundell et al. |
| 2011/0145501 A1 | 6/2011 | Steely, Jr. et al. |
| 2011/0208894 A1 | 8/2011 | Gala et al. |
| 2011/0231612 A1 | 9/2011 | Karlsson et al. |

OTHER PUBLICATIONS

Harris et al., "Transactional Memory: An Overview", Micro, IEEE, vol. 27, No. 3, pp. 8-29, May-Jun. 2007.

Steffan, "Hardware Support for Thread-Level Speculation", Ph.D. Dissertation, Carnegie Melon Univ., Pittsburgh, PA, USA, AA13159472, (Apr. 2003).

Renau et al., "Tasking with out-of-order spawn in TLS chip multi-processors: microarchitecture and compilation", In Proceedings of the 19th annual international conference on Supercomputing (ICS '05), ACM, New York, NY, USA, pp.179-188, DOI=10.1145/1088173, (Jun. 20-22, 2005).

Fang et al., "Active Memory Operations", 21st International Conference on Supercomputing, ICS'07, Jun. 18-20, 2007, Seattle, WA, USA.

Fang et al., "Fast synchronization on shared-memory multiprocessors: An architectural approach", J. Parallel Distributed Computing, vol. 65 (2005) pp. 1158-1170, received Apr. 1, 2005; accepted Apr. 1, 2005, available online Jun. 22, 2005.

Ahn et al., "Scatter-Add in Data Parallel Architectures", Eleventh International symposium on High Performance Computer Architecture (HPCA-11), Feb. 2005, San Francisco, CA, USA.

Mellor-Crummey et al., "Algorithms for Scalable Synchronization on Shared-Memory Multiprocessors", ACM Trans. Comp. Syst. C-9(1), Jan. 1991, pp. 21-65.

Freudenthal et al., "Process Coordination with Fetch-and-Increment", In Proceedings of the 4th International Conference on Architecture Support for Programming Languages and Operating Systems, Apr. 1991, Santa Clara, CA, pp. 1-17.

Michael et al., "Nonblocking Algorithms and Preemption-Safe Locking on Multiprogrammed Shared Memory.Multiprocessors", Journal of Parallel and Distributed Computing, 51, 1-26, Article No. PC981446; received Jan. 14, 1997, revised Dec. 27, 1997, accepted Jan. 10, 1998.

Lipovski et al., "A Fetch-And-Op Implementation for Parallel Computers", Proceedings 15th Annual International Symposium Computer Architecture, 1988, pp. 384-392.

Herlihy, "Wait-Free Synchronization", ACM Transactions on Programming Languages and Systems, vol. 11, No. 1, pp. 124-149, Jan. 1991.

Buntinas et al., "Designing a Common Communication Subsystem", Euro PVM/MPI, 2005 Conference, Sep. 2005.

Lepak et al., "On the Value Locality of Store Instructions", Proceedings of the 27th Annual International Symposium on Computer Architecture, Vancouver, Canada, Jun. 12-14, 2000.

Calder et al., "A Comparative Survey to Load Speculation Architectures", Journal of Instruction-Level Parallelism 1 (2000), 1-39, published May 2000, pp. 1-34.

* cited by examiner

CACHE DIRECTORY LOOKUP READER SET ENCODING FOR PARTIAL CACHE LINE SPECULATION SUPPORT

CROSS REFERENCE TO RELATED APPLICATIONS

The present application is being filed concurrently with Ser. No. 13/008,583.

Benefit is claimed of the following applications, in particular:

61/295,669, filed Jan. 15, 2010 and
61/299,911 filed Jan. 29, 2010, both for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT", And of the following applications in general Benefit of the following applications is claimed and they are also incorporated by reference: U.S. patent application Ser. No. 12/796,411 filed Jun. 8, 2010; U.S. patent application Ser. No. 12/696,780, filed Jan. 29, 2010; U.S. provisional patent application Ser. No. 61/293,611, filed Jan. 8, 2010; U.S. patent application Ser. No. 12/684,367, filed Jan. 8, 2010; U.S. patent application Ser. No. 12/684,172, filed Jan. 8, 2010; U.S. patent application Ser. No. 12/684,190, filed Jan. 8, 2010; U.S. patent application Ser. No. 12/684,496, filed Jan. 8, 2010; U.S. patent application Ser. No. 12/684,429, filed Jan. 8, 2010; U.S. patent application Ser. No. 12/697,799 filed Feb. 1, 2010; U.S. patent application Ser. No. 12/684,738, filed Jan. 8, 2010; U.S. patent application Ser. No. 12/684,860, filed Jan. 8, 2010; U.S. patent application Ser. No. 12/684,174, filed Jan. 8, 2010; U.S. patent application Ser. No. 12/684,184, filed Jan. 8, 2010; U.S. patent application Ser. No. 12/684,852, filed Jan. 8, 2010; U.S. patent application Ser. No. 12/684,642, filed Jan. 8, 2010; U.S. patent application Ser. No. 12/684,804, filed Jan. 8, 2010; U.S. provisional patent application Ser. No. 61/293,237, filed Jan. 8, 2010; U.S. patent application Ser. No. 12/693,972, filed Jan. 26, 2010; U.S. patent application Ser. No. 12/688,747, filed Jan. 15, 2010; U.S. patent application Ser. No. 12/688,773, filed Jan. 15, 2010; U.S. patent application Ser. No. 12/684,776, filed Jan. 8, 2010; U.S. patent application Ser. No. 12/696,825, filed Jan. 29, 2010; U.S. patent application Ser. No. 12/684,693, filed Jan. 8, 2010; U.S. provisional patent application Ser. No. 61/293,494, filed Jan. 8, 2010; U.S. patent application Ser. No. 12/731,796, filed Mar. 25, 2010; U.S. patent application Ser. No. 12/696,746, filed Jan. 29, 2010; U.S. patent application Ser. No. 12/697,015 filed Jan. 29, 2010; U.S. patent application Ser. No. 12/727,967, filed Mar. 19, 2010; U.S. patent application Ser. No. 12/727,984, filed Mar. 19, 2010; U.S. patent application Ser. No. 12/697,043 filed Jan. 29, 2010; U.S. patent application Ser. No. 12/697,175, Jan. 29, 2010; U.S. patent application Ser. No. 12/684,287, filed Jan. 8, 2010; U.S. patent application Ser. No. 12/684,630, filed Jan. 8, 2010; U.S. patent application Ser. No. 12/723,277 filed Mar. 12, 2010; U.S. patent application Ser. No. 12/696,764, filed Jan. 29, 2010; U.S. patent application Ser. No. 12/696,817 filed Jan. 29, 2010; U.S. patent application Ser. No. 12/697,164, filed Jan. 29, 2010; U.S. patent application Ser. No. 12/796,411, filed Jun. 8, 2010; and, U.S. patent application Ser. No. 12/796,389, filed Jun. 8, 2010.

All of the above applications are incorporated by reference

GOVERNMENT CONTRACT

This invention was made with Government support under Contract No.: B554331 awarded by Department of Energy. The Government has certain rights in this invention 21.

BACKGROUND

The invention relates to conflict checking in a multiprocessor system with speculative execution.

A multiprocessor system typically includes cache memory. In the context of speculative execution, cache memory will normally include various data versions, i.e. versions that are created or read by threads of a program executing in parallel. These versions may be in conflict with one another. In other words, as threads execute out of order they may create or access data that is visible for only a subset of threads.

In the case of the type of speculation called TM: when a thread reads data speculatively from a line, it sets its speculative reader bit in its local cache and the line is starting at that point in a "speculatively read, shared" state. If any thread now tries to write to the line, no matter to which point within the line, this write is broadcast to all caches. The standard coherence scheme without speculation would in this case invalidate all copies in all caches except for the local cache of the writer, and would mark the local version of the writer as modified. In TM, the transition from "speculatively read, shared" to invalid would cause the transaction for this core to fail and to be invalidated.

In the case of the type of speculation known as TLS, the most simple implementation behaves like TM described above. More evolved schemes compare the speculation IDs of the writer with the one used by the core that has the line in "speculatively read, shared" state. If the reader thread is older than the writer the reader is not invalidated and the line is not invalidated from its cache as well.

SUMMARY

The invention arose in the context of the IBM® Blue Gene® project where a cache memory is the point of coherence and conflict checking is done in control circuitry for that cache memory. More about these aspects of the project is to be found in the applications incorporated by reference. The present application relates to encoding read accesses in such control circuitry.

One embodiment is a method for use in a multiprocessor system. The system includes a plurality of processors running speculative threads in parallel; and at least one cache shared by the processors. The method includes:

in a control unit of the cache, maintaining a dynamic record of read accesses to the cache, the dynamic record comprising an indication of a portion of a line read;

directing memory accesses for a same physical address from all the processors through a same memory addressing scheme of the control unit;

performing conflict checking for all the processors of the system using the record to locate potential conflicts.

Another embodiment is a multiprocessor system including a plurality of processors adapted to run threads in parallel; and at least one data path directing all memory access requests from the processors and relating to a same physical address to a shared cache resource; and at least one cache memory. The cache memory is shared by the processors and includes a control unit adapted to perform operations. The operations include conflict checking for the processors, and maintaining at least one dynamic record associated with at least one line of cache and comprising an indication of a portion of the line read by at least one thread.

Objects and advantages will be apparent in throughout this document and drawings.

BRIEF DESCRIPTION OF DRAWING

Embodiments will now be described by way of non-limiting example with reference to the following figures.

DETAILED DESCRIPTION

A review of literature relating to reader set encodings follows. This literature review is not an admission that it would be obvious to combine the listed documents "Bulk Disambiguation of Speculative Threads in Multiprocessors", Luis Ceze, James Tuck, Calin Cascaval, Josep Torrellas. ISCA, June 2006. This paper describes a method of encoding reader and writer sets. It stores all addresses accessed so far for reads and writes in two sets (here called signatures) per thread. The encoding is using a superset encoding using hashes. This set is not stored in the cache directory.

Harris, T.; Cristal, A.; Unsal, O. S.; Ayguade, E.; Gagliardi, F.; Smith, B.; Valero, M.; "Transactional Memory: An Overview," Micro, IEEE, vol. 27, no. 3, pp. 8-29, May-June 2007 In this overview paper, an implementation is referenced in which the directory of the first level cache stores only a single bit per line to mark whether the line has been accessed speculatively:

J. Gregory Steffan. 2003. Hardware Support for Thread-Level Speculation. Ph.D. Dissertation. Carnegie Mellon Univ., Pittsburgh, Pa., USA. AAI3159472. The implementation described in this PhD theses uses Epoch numbers per cache line, which are equivalent to our speculation IDs. The theses just has a state to indicate a line has been speculatively accessed, but it gives no indication that it would store the Epoch number of the readers. So it basically has only a single bit to signify a line has been speculatively read and stores one such bit in the local cache of the reading thread.

Jose Renau, James Tuck, Wei Liu, Luis Ceze, Karin Strauss, and Josep Torrellas. 2005. Tasking with out-of-order spawn in TLS chip multiprocessors: microarchitecture and compilation. In Proceedings of the 19th annual international conference on Supercomputing (ICS '05). ACM, New York, N.Y., USA, 179-188. DOI=10.1145/1088149.1088173 Uses interval representation instead of integer short IDs, allowing ID values between existing ID values to be created later on. Still uses no ID ranges for reader encoding, just a flag for a line being speculatively read is assumed.

Throughout this disclosure a particular embodiment of a multi-processor system will be discussed. This discussion may include various numerical values or numbers of components. These values or numbers are not intended to be limiting, but only examples. One of ordinary skill in the art might devise other examples as a matter of design choice.

Figure 1:
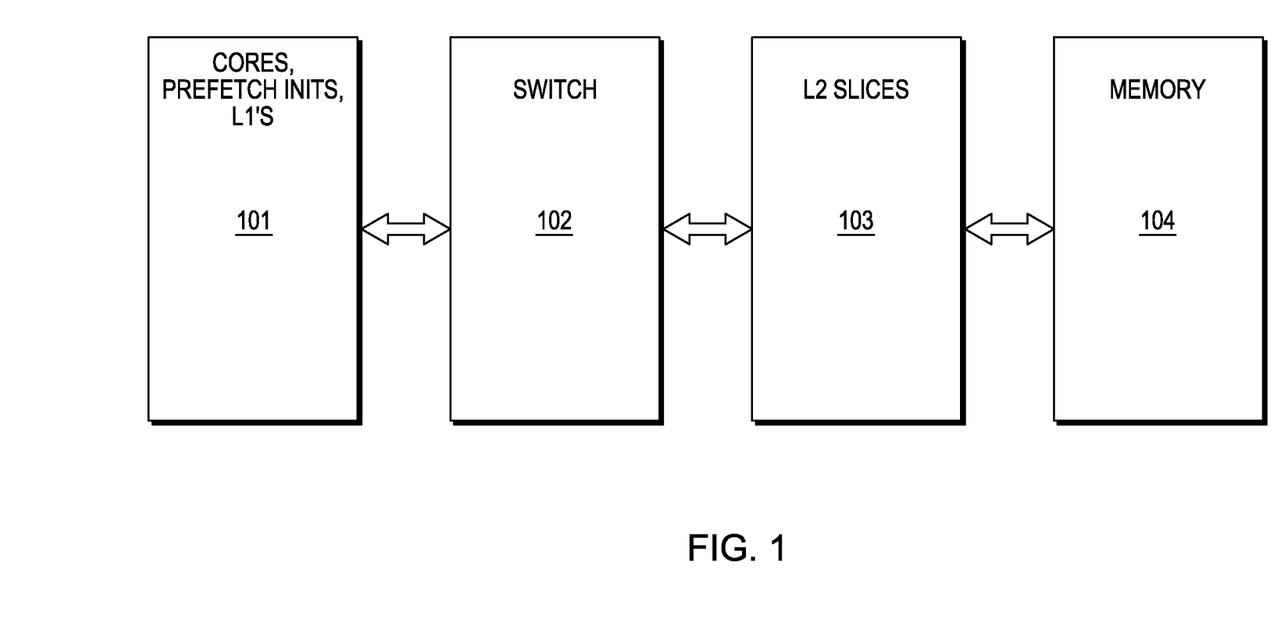
FIG. 1 shows an overview of a system within which the invention may be implemented.

The present invention arose in the context of the IBM® BlueGene® project, which is further described in the applications incorporated by reference above. FIG. 1 is a schematic diagram of an overall architecture of a multiprocessor system in accordance with this project, and in which the invention may be implemented. At 101, there are a plurality of processors operating in parallel along with associated prefetch units and L1 caches. A plurality of threads execute in parallel on the processors. At 102, there is a switch. At 103, there are a plurality of L2 slices. At 104, there is a main memory unit. It is envisioned, for the preferred embodiment, that the L2 cache should be the point of coherence.

These threads can be the subject of "speculative execution," meaning that a thread or threads can be started as a sort of wager or gamble, without knowledge of whether the thread can complete successfully. A given thread cannot complete successfully if some other thread modifies the data that the given thread is using in such a way as to invalidate the given thread's results. The terms "speculative," "speculatively," "execute," and "execution" are terms of art in this context. These terms do not imply that any mental step or manual operation is occurring. All operations or steps described herein are to be understood as occurring in an automated fashion under control of computer hardware or software.

Three modes of speculative execution are to be supported: Speculative Execution (SE) (also referred to as Thread Level Speculation ("TLS")), Transactional Memory ("TM"), and Rollback.

SE is used to parallelize programs that have been written as sequential program. When the programmer writes this sequential program, she may insert commands to delimit sections to be executed concurrently. The compiler can recognize these sections and attempt to run them speculatively in parallel, detecting and correcting violations of sequential semantics When referring to threads in the context of Speculative Execution, the terms older/younger or earlier/later refer to their relative program order (not the time they actually run on the hardware).

In Speculative Execution, successive sections of sequential code are assigned to hardware threads to run simultaneously. Each thread has the illusion of performing its task in program order. It sees its own writes and writes that occurred earlier in the program. It does not see writes that take place later in program order even if (because of the concurrent execution) these writes have actually taken place earlier in time.

To sustain the illusion, the L2 gives threads private storage as needed, accessible by software thread ID. It lets threads read their own writes and writes from threads earlier in program order, but isolates their reads from threads later in program order. Thus, the L2 might have several different data values for a single address. Each occupies an L2 way, and the L2 directory records, in addition to the usual directory information, a history of which thread IDs are associated with reads and writes of a line. A speculative write is not to be written out to main memory.

One situation that will break the program-order illusion is if a thread earlier in program order writes to an address that a thread later in program order has already read. The later thread should have read that data, but did not. The solution is to kill the later software thread and invalidate all the lines it has written in L2, and to repeat this for all younger threads. On the other hand, without such interference a thread can complete successfully, and its writes can move to external main memory when the line is cast out or flushed.

Not all threads need to be speculative. The running thread earliest in program order can be non-speculative and run conventionally; in particular its writes can go to external main memory. The threads later in program order are speculative and are subject to be killed. When the non-speculative thread completes, the next-oldest thread can be committed and it then starts to run non-speculatively.

The following sections describe the implementation of the speculation model in the context of addressing.

When a sequential program is decomposed into speculative tasks, the memory subsystem needs to be able to associate all memory requests with the corresponding task. This is done by assigning a unique ID at the start of a speculative task to the thread executing the task and attaching the ID as tag to all its requests sent to the memory subsystem.

As the number of dynamic tasks can be very large, it may not be practical to guarantee uniqueness of IDs across the entire program run. It is sufficient to guarantee uniqueness for all IDs concurrently present in the memory system. More about the use of speculation ID's, including how they are allocated, committed, and invalidated, appears in the incorporated applications.

Transactions as defined for TM occur in response to a specific programmer request within a parallel program. Generally the programmer will put instructions in a program delimiting sections in which TM is desired. This may be done by marking the sections as requiring atomic execution. According to the PowerPC architecture: "An access is single-copy atomic, or simply "atomic", if it is always performed in its entirety with no visible fragmentation."

To enable a TM runtime system to use the TM supporting hardware, it needs to allocate a fraction of the hardware resources, particularly the speculation IDs that allow hardware to distinguish concurrently executed transactions, from the kernel (operating system), which acts as a manager of the hardware resources. The kernel configures the hardware to group IDs into sets called domains, configures each domain for its intended use, TLS, TM or Rollback, and assigns the domains to runtime system instances.

At the start of each transaction, the runtime system executes a function that allocates an ID from its domain, and programs it into a register that starts marking memory access as to be treated as speculative, i.e., revocable if necessary.

When the transaction section ends, the program will make another call that ultimately signals the hardware to do conflict checking and reporting. Based on the outcome of the check, all speculative accesses of the preceding section can be made permanent or removed from the system.

The PowerPC architecture defines an instruction pair known as larx/stcx. This instruction type can be viewed as a special case of TM. The larx/stcx pair will delimit a memory access request to a single address and set up a program section that ends with a request to check whether the instruction pair accessed the memory location without interfering access from another thread. If an access interfered, the memory modifying component of the pair is nullified and the thread is notified of the conflict More about a special implementation of larx/stcx instructions using reservation registers is to be found in co-pending application Ser. No. 12/697,799 filed Jan. 29, 2010, which is incorporated herein by reference. This special implementation uses an alternative approach to TM to implement these instructions. In any case, TM is a broader concept than larx/stcx. A TM section can delimit multiple loads and stores to multiple memory locations in any sequence, requesting a check on their success or failure and a reversal of their effects upon failure Rollback occurs in response to "soft errors," temporary changes in state of a logic circuit. Normally these errors occur in response to cosmic rays or alpha particles from solder balls. The memory changes caused by a programs section executed speculatively in rollback mode can be reverted and the core can, after a register state restore, replay the failed section.

Figure 2:
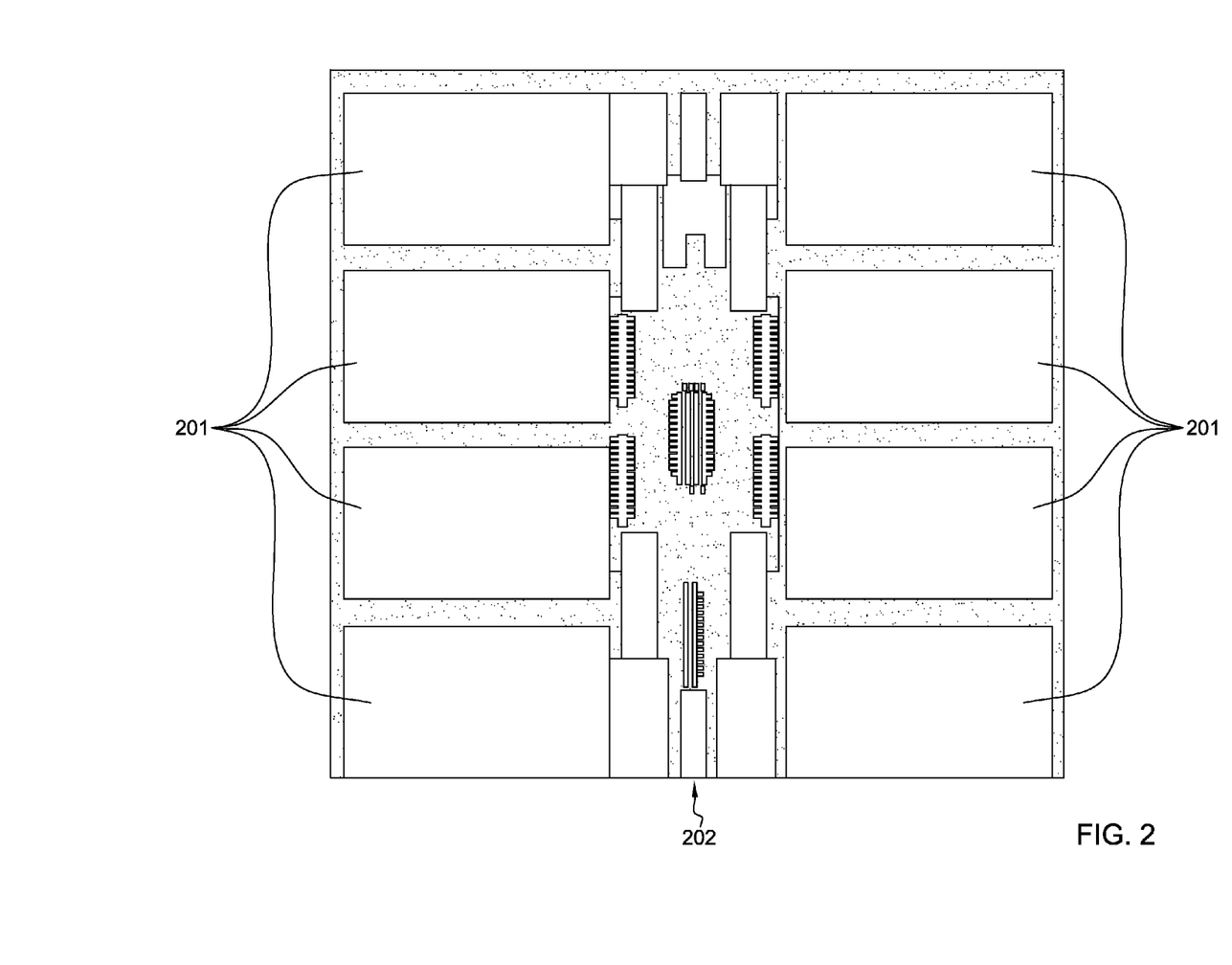
FIG. 2 shows a map of a cache slice.

FIG. 2 shows a cache slice. It includes arrays of data storage 201, and a central control portion 202.

Figure 3:
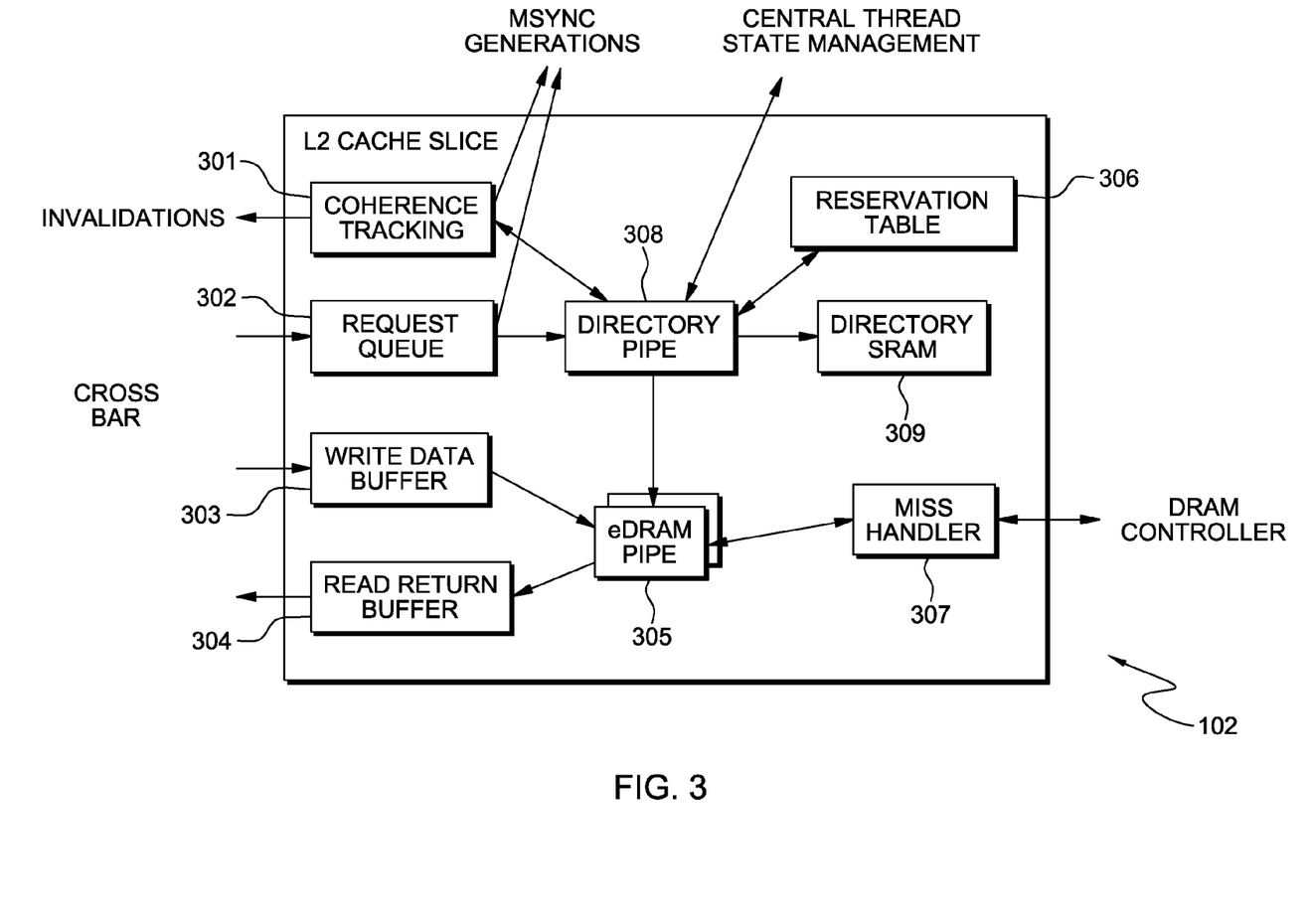
FIG. 3 is a schematic of the control unit of an L2 slice.

FIG. 3 shows features of an embodiment of the control section 102 of a cache slice.

Coherence tracking unit 301 issues invalidations, when necessary. These invalidations are issued centrally, while in the prior generation of the Blue Gene® project, invalidations were achieved by snooping.

The request queue 302 buffers incoming read and write requests. In this embodiment, it is 16 entries deep, though other request buffers might have more or less entries. The addresses of incoming requests are matched against all pending requests to determine ordering restrictions. The queue presents the requests to the directory pipeline 308 based on ordering requirements.

The write data buffer 303 stores data associated with write requests. This buffer passes the data to the eDRAM pipeline 305 in case of a write hit or after a write miss resolution.

The directory pipeline 308 accepts requests from the request queue 302, retrieves the corresponding directory set from the directory SRAM 309, matches and updates the tag information, writes the data back to the SRAM and signals the outcome of the request (hit, miss, conflict detected, etc.).

The L2 implements four eDRAM pipelines 305 that operate independently. They may be referred to as eDRAM bank 0 to eDRAM bank 3. The eDRAM pipeline controls the eDRAM access and the dataflow from and to this macro. If writing only subcomponents of a doubleword or for load-and-increment or store-add operations, it is responsible to schedule the necessary RMW cycles and provide the dataflow for insertion and increment.

The read return buffer 304 buffers read data from eDRAM or the memory controller 78 and is responsible for scheduling the data return using the switch 60. In this embodiment it has a 32 B wide data interface to the switch. It is used only as a staging buffer to compensate for backpressure from the switch. It is not serving as a cache.

The miss handler 307 takes over processing of misses determined by the directory. It provides the interface to the DRAM controller and implements a data buffer for write and read return data from the memory controller, The reservation table 306 registers and invalidates reservation requests.

Figure 3A:
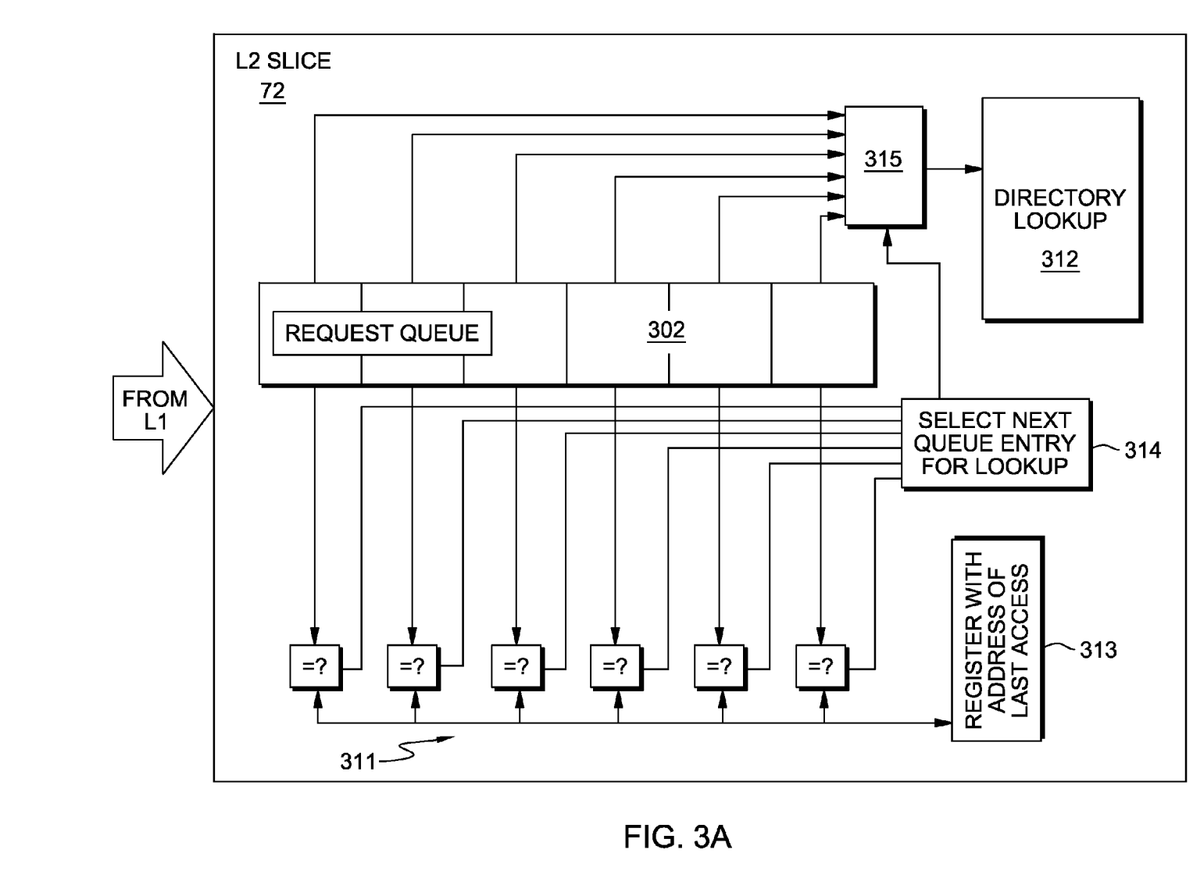
FIG. 3A shows a request queue and retaining data associated with a previous memory access request.

Per FIG. 3A, the L2 slice 72 includes a request queue 302. At 311, a cascade of modules tests whether pending memory access requests will require data associated with the address of a previous request, the address being stored at 313. These tests might look for memory mapped flags from the L1 or for some other identification. A result of the cascade 311 is used to create a control input at 314 for selection of the next queue entry for lookup at 315, which becomes an input for the directory look up module 312.

Figure 3B:
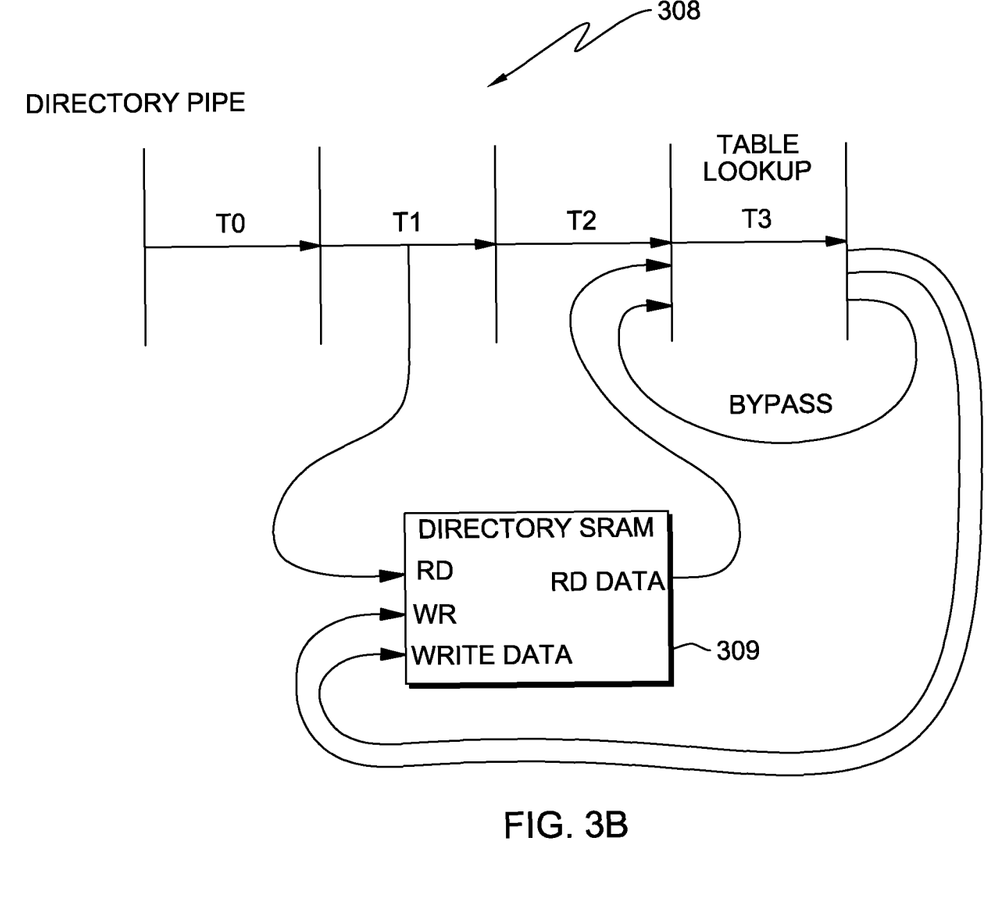
FIG. 3B shows interaction between the directory pipe and directory SRAM.

FIG. 3B shows more about the interaction between the directory pipe 308 and the directory SRAM 309. The vertical lines in the pipe represent time intervals during which data passes through a cascade of registers in the directory pipe. In a first time interval T1, a read is signaled to the directory SRAM. In a second time interval T2, data is read from the directory SRAM. In a third time interval, T3, a table lookup informs writes WR and WR DATA to the directory SRAM. In general, table lookup will govern the behavior of the directory SRAM to control cache accesses responsive to speculative execution. Only one table lookup is shown at T3, but more might be implemented.

Figure 3C:
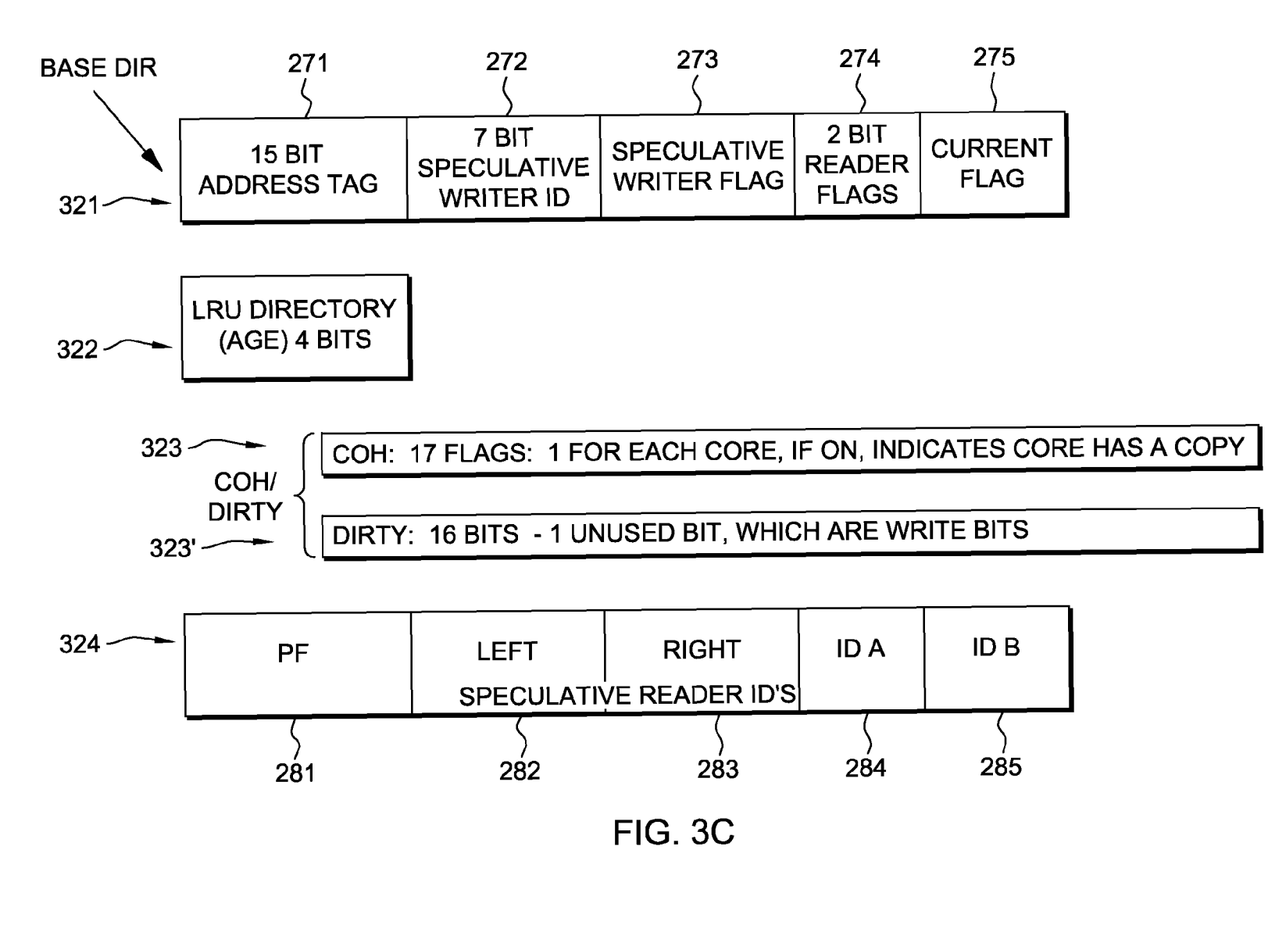
FIG. 3C shows structure of the directory SRAM 309.

FIG. 3C shows the formats of 4 directory SRAMs included at 309, to with:
- a base directory 321;
- a least recently used directory 322;
- a COH/dirty directory 323 and 323'; and
- a speculative reader directory 324.

In the base directory, 321, there are 15 bits that locate the line at 271. Then there is a seven bit speculative writer ID field 272 and a flag 273 that indicates whether the write is speculative. Then there is a two bit speculative read flag field 274 indicating whether to invoke the speculative reader directory 324, and a one bit "current" flag 275. The current flag 275 indicates whether the current line is assembled from all necessary versions to reflect the view of the ID stored in the writer ID field. The processor, A2, does not control the fields 272-275 directly. These fields are set by the L2 directory pipeline in response to speculative accesses.

If the speculative writer flag is checked, then the way has been written speculatively, not taken from main memory and the writer ID field will say what ID the write access was tagged with. If the flag is clear, the writer ID field is irrelevant.

The LRU directory indicates "age", which is an ordering number reflecting the order of last use of the way. This directory is for allocating ways in accordance with the Least Recently Used algorithm.

The COH/dirty directory has two uses, and accordingly two possible formats. In the first format, 323, known as "COH," there are 17 bits, one for each core of the system. This format indicates, when the writer flag is not set, whether the corresponding core has a copy of this line of the cache. In the second format, 323', there are 16 bits. These bits indicate, if the writer flag is set in the base directory, which part of the line has been modified speculatively. The line has 128 bytes, but they are recorded at 323' in groups of 8 bytes, so only 16 bits are used, one for each group of eight bytes.

Speculative reads are recorded for each way from which data is retrieved while processing a request. As multiple speculative reads from different IDs for different sections of the line need to be recorded, the L2 uses a dynamic encoding that provides a superset representation of the read accesses.

The speculative reader directory 324 has fields PF for the prefix determining the encoding type 281. An example of an encoding type is shown, including left boundary 282, right boundary 283, a first speculative ID 284, and a second ID 285. The speculative reader directory is invoked in response to flags in field 274.

Figure 3D:
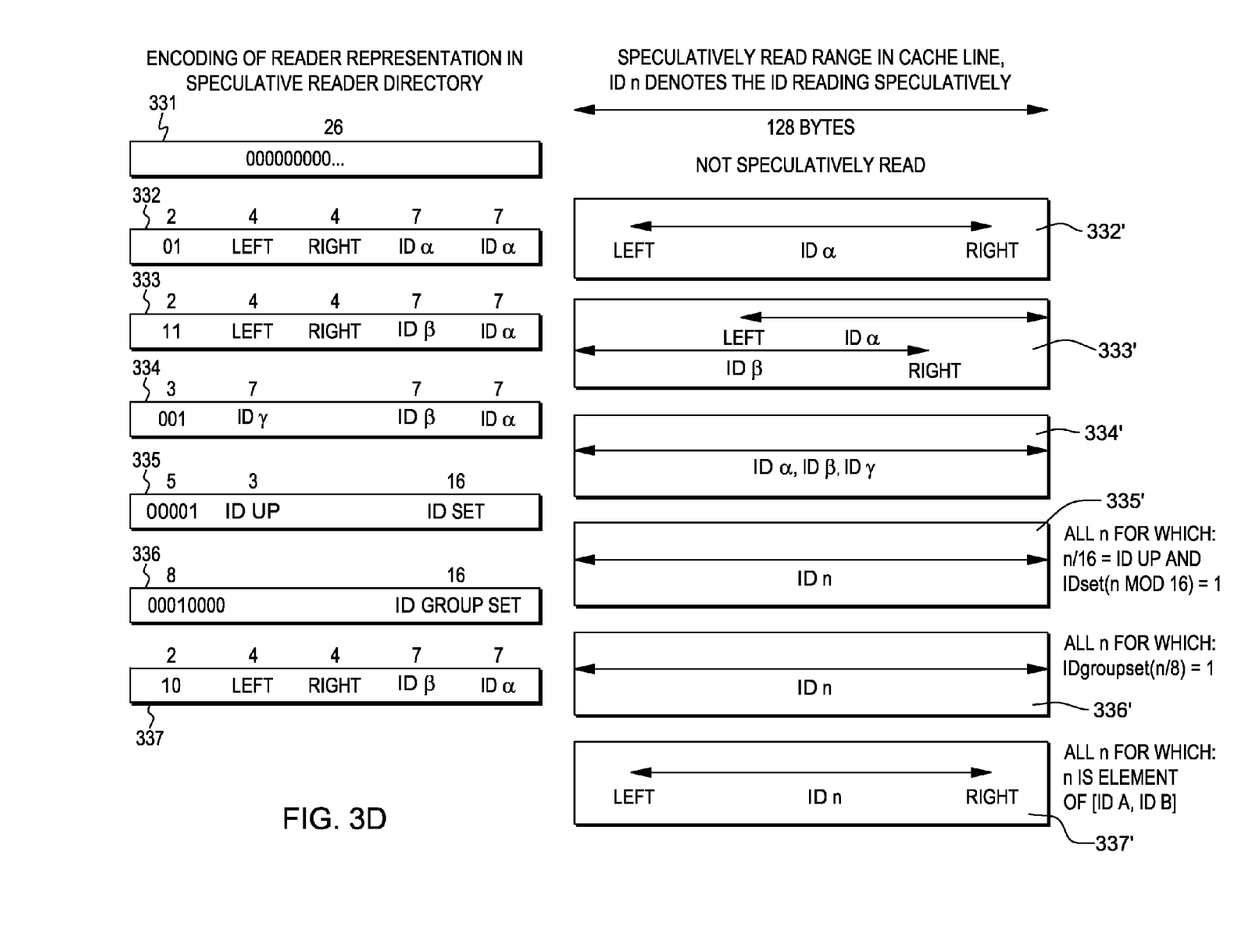
FIG. 3D shows more about encoding for the reader set aspect of the directory.

FIG. 3D shows the possible formats of the reader set directory. The left column illustrates the seven possible formats of the reader set directory, while the right column indicates what the result in the cache line would be for that format. Formats 331, 336, and 337 can be used for TLS, while formats 331-336 can be used for TM.

Format 331 indicates that no speculative reading has occurred.

Format 332 uses two bit code "01" to indicate that a single seven bit ID, α, has read in a range delimited by boundaries denoted "left" and "right".

If only a single TLS or TM ID has read the line, the L2 records the ID along with the left and right boundary of the line section so far accessed by the thread. Boundaries are always rounded to the next double word boundary.

If two IDs in TM have accessed the line, the IDs along with the gap between the two accessed regions are recorded. Format 333 uses two bit code "11" to indicate that a first seven bit ID denoted "α" has read from a boundary denoted with four bits symbolized by the word "left" to the end of the line; while a seven bit second ID, denoted "β" has read from the beginning of the line to a boundary denoted by four bits symbolized by the word "right."

Format 334 uses three bit code "001" to indicate that three seven bit IDs, denoted "α," "β," and "γ," have read the entire line. In fact, when the entire line is indicated in this figure, it might be that less than the entire line has been read, but the encoding has no space to store the additional information needed to characterize the footprint.

Format 335 uses five bit code "00001" to indicate that several IDs have read the entire line. The range of IDs is indicated by the three bit field denoted "ID up". This range includes the sixteen IDs that share the same upper three bits. Which of the sixteen IDs have read the line is indicated by respective flags in the sixteen bit field denoted "ID set," in other words all n for which: n/16=ID up and IDset(n mod 16)=1. For instance if IDup is 0, then ID 0 has read the line if IDset(0 mod 16)=IDset (0)=1, i.e., if the bit 0 of the 16 bit wide bitset is '1'. ID 1 is represented by bit 1, ID2 by bit 2 etc. If IDup is one, ID 16 is represented by bit 0, id 17 by bit 1 and so on.

An alternative encoding could use more bits than "ID up" to identify the set, e.g., by storing the value of the first ID. The set would then represent the IDs "first ID" to ("first ID"+ width of bitset−1). The additional precision allows the set to start at any ID instead of at every 16$^{th}$ ID. The "first ID" value serves here as a pointer to the set of ID represented.

If two or more TLS IDs have accessed the line, the youngest and the oldest ID along with the left and right boundary of the aggregation of all accesses are recorded.

Format 337 uses the two bit code "10" to indicate that two seven bit IDs, denoted "α" and "β" have read a range delimited by boundaries indicated by the four bit fields denoted "left" and "right."

Format 336 uses the eight bit code "00010000" to indicate that groups of IDs have read the entire line. This group is defined by a 16 bit field denoted "IDgroupset," i.e. all n for which: IDgroupset(n/8)=1. Each bit of this field represents a group of IDs, and the aggregate of all bits of this bitset represents the aggregate of all IDs. In the preferred implementation, a total of 128 IDs are implemented and the IDgroupset field is 16 bits wide. Each bit represents 8 subsequent IDs, resulting in all 128 IDs being represented by the 16 groups. When a bit in this bitset is set, the line has been read by at least one ID of the corresponding group.

When doing Write After Read ("WAR") conflict checking, the formats of FIG. 3D are used. For each format 331-337, in the left column of FIG. 3D, the figure includes a corresponding block 331'-337' in the right column that illustrates the extent of the line that was read by the read recorded by that format.

Rollback ID reads are not recorded.

If more than two TM IDs, a mix of TM and TLS IDs or TLS IDs from different domains have been recorded, the encodings shown do not provide field indicating the boundary of the accesses within a 128 B line. In this case, the two flags 274 indicate which of the two 64 B halves of the line have been speculatively accessed, increasing the resolution from 128 B to 64 B for the most common cases.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Ordinal terms in the claims, such as "first" and "second" are used for distinguishing elements and do not necessarily imply order of operation.

Items illustrated as boxes in flowcharts herein might be implemented as software or hardware as a matter of design choice by the skilled artisan. Software might include sequential or parallel code, including objects and/or modules. Modules might be organized so that functions from more than one conceptual box are spread across more than one module or so that more than one conceptual box is incorporated in a single module. Data and computer program code illustrated as residing on a medium might in fact be distributed over several media, or vice versa, as a matter of design choice. Such media might be of any suitable type, such as magnetic, electronic, solid state, or optical Any algorithms given herein can be implemented as computer program code and stored on a machine readable medium, to be performed on at least one processor. Alternatively, they may be implemented as hardware. They are not intended to be executed manually or mentally.

The use of variable names in describing operations in a computer does not preclude the use of other variable names for achieving the same function.

The present application may use language that is anthropomorphic in describing operations of a computer. Any such anthropomorphic language is not intended to imply that the claimed invention reads on a human being thinking or performing manual operations. The claims are intended to be interpreted as reading on operations of a machine.

The invention claimed is:

1. In a multiprocessor system comprising
   a plurality of processors running speculative threads in parallel;
   at least one cache shared by the processors,
   a method comprising:
   in a control unit of the cache, maintaining a dynamic record of read accesses to the cache, the dynamic record comprising an indication of an encoding of a superset of speculative reading threads and access footprints of those processes within a cache line; said encoding of a superset of speculative reading threads and access footprints including a multi-bit field, each bit of said field representing a group of IDs, wherein an aggregate of all IDs is represented as the aggregate of all bits of this field; and a bit set in a field representing the cache line has been read by at least one ID of a corresponding group;
   directing memory accesses for a same physical address from all the processors through a same memory addressing scheme of the control unit; and
   performing conflict checking for all the processors of the system using the record to locate potential conflicts.

2. The method of claim 1, wherein each speculative thread identifier comprises a speculative thread identification number, said indication further comprising an associated read access boundary.

3. The method of claim 2, wherein the indication comprises an identification of both a left and right boundary, wherein said first speculative thread ID reads from an associated leftmost read access boundary to an end of said single cache line, and said second speculative thread ID reads from an associated rightmost read access boundary to a beginning of said single cache line.

4. The method of claim 1, wherein for two or more speculative threads having an age order, the indication comprises an identification of youngest and oldest reading threads along with left and right boundaries of an aggregation of all accesses recorded.

5. The method of claim 1, wherein an access to less than a doubleword is treated as an access to the whole doubleword.

6. The method of claim 1, wherein the identification comprises an encoding of a superset of a footprint by storing left and right boundaries of the footprint.

7. The method of claim 3, wherein the identification comprises encoding a superset of two footprints by storing a gap between two footprints or overlap of two footprints.

8. The method of claim 7, comprising storing the footprint boundaries facing the other footprint.

9. The method of claim 1, wherein the control unit comprises a cache directory mechanism for storing the record.

10. A multiprocessor system comprising:
    a plurality of processors adapted to run threads in parallel;
    at least one data path directing all memory access requests from the processors and relating to a same physical address to a shared cache resource; and
    at least one cache memory, shared by the processors, comprising a control unit adapted to perform operations comprising:
    conflict checking for the processors, and
    maintaining at least one dynamic record associated with at least one line of cache and comprising an indication of an encoding of a superset of speculative reading threads and access footprints of those processes within a cache line; said encoding of a superset of speculative reading threads and access footprints including a multi-bit field, each bit of said field representing a group of IDs, wherein an aggregate of all IDs is represented as the aggregate of all bits of this field; and a bit set in a field representing the cache line has been read by at least one ID of a corresponding group.

11. The system of claim 10, wherein each speculative thread identifier comprises a speculative thread identification number, said indication further comprising an associated read access boundary.

12. The system of claim 11, wherein the indication comprises an identification of both a left and right boundary, wherein said first speculative thread ID reads from an associated leftmost read access boundary to an end of said single cache line, and said second speculative thread ID reads from an associated rightmost read access boundary to a beginning of said single cache line.

13. The system of claim 12, wherein for two or more speculative threads having an age order, the indication comprises an identification of youngest and oldest reading threads along with left and right boundaries of an aggregation of all accesses recorded.

14. The system of claim 10, wherein an access to less than a doubleword is treated as an access to the whole doubleword.

15. The system of claim 10, wherein the identification comprises an encoding of a superset of a footprint by storing left and right boundaries of the footprint.

16. The system of claim 12, wherein the identification comprises an encoding a superset of two footprints by storing a gap between two footprints or overlap of two footprints.

17. The system of claim 16, comprising storing the footprint boundaries facing the other footprint.

18. The system of claim 10, wherein the control unit comprises a speculative reader cache directory mechanism for storing the record.

* * * * *